Jan. 11, 1949.                G. M. WALLER                2,458,755
             CENTER GUIDE TREAD MEMBER FOR ENDLESS TRACKS
Filed June 6, 1945                                    2 Sheets-Sheet 1
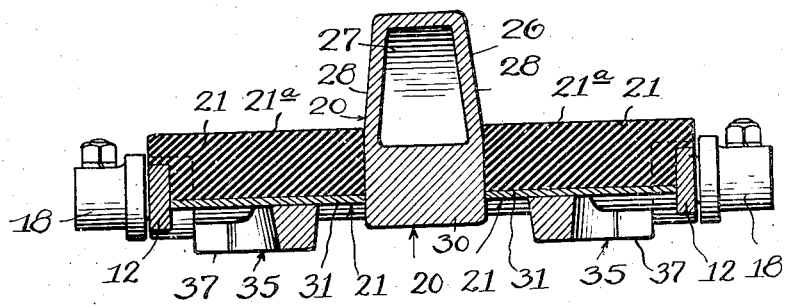
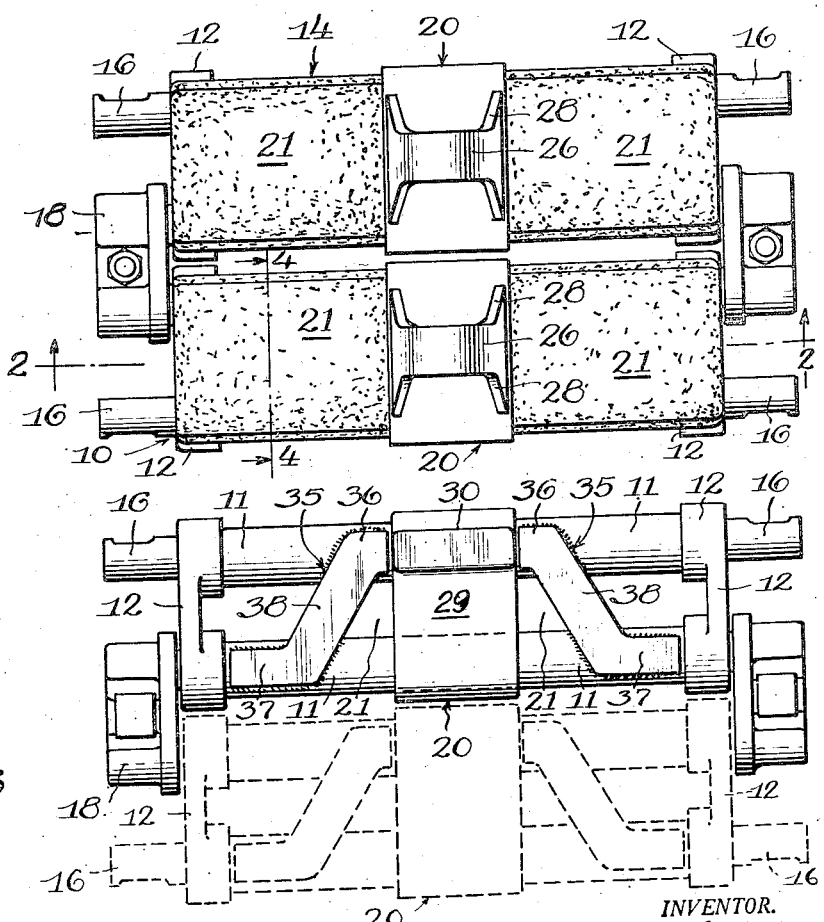
INVENTOR.
Gustav M. Waller
BY
Clarence F. Poole
Atty Jan. 11, 1949. G. M. WALLER 2,458,755
CENTER GUIDE TREAD MEMBER FOR ENDLESS TRACKS
Filed June 6, 1945 2 Sheets-Sheet 2
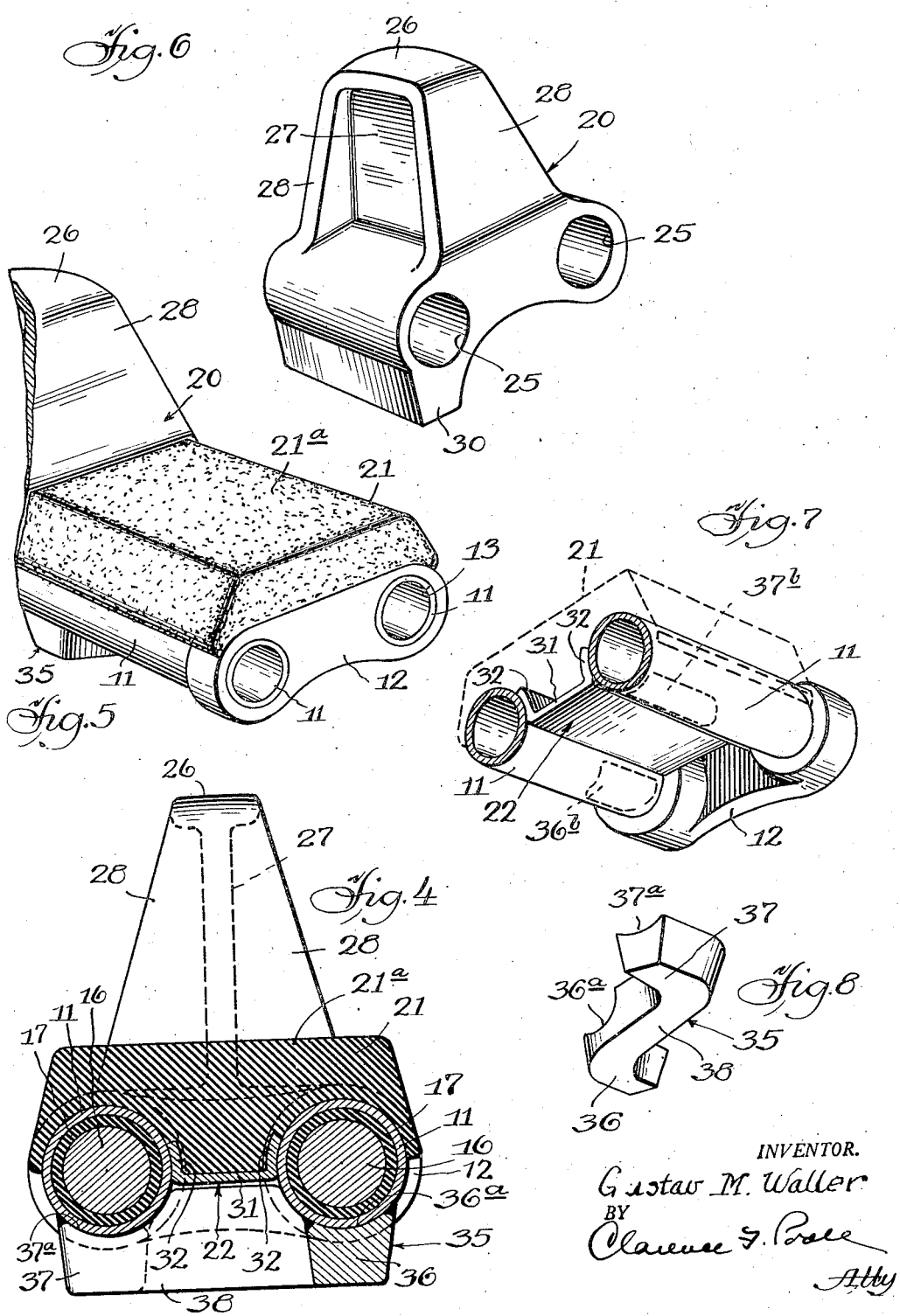
INVENTOR.
Gustav M. Waller
BY
Clarence F. Poole
Atty Patented Jan. 11, 1949

2,458,755

UNITED STATES PATENT OFFICE 2,458,755

CENTER GUIDE TREAD MEMBER FOR ENDLESS TRACKS

Gustav M. Waller, Dundee, Ill., assignor to Burgess-Norton Manufacturing Company, Geneva, Ill., a corporation of Illinois Application June 6, 1945, Serial No. 597,879

7 Claims. (Cl. 305—10)

This invention relates to improvements in tread members for endless tracks especially adapted for tanks and similar vehicles, and more particularly to relatively wide tread units having guide members disposed centrally thereof for engagement with the drive sprockets and bogie wheels over which the endless track is trained.

Among the objects of the invention is to provide a track structure of the character above described especially designed to withstand the punishment and hard usage to which tanks and like vehicles for war use are subjected.

Further and more particular objects are to provide a simple, strong, durable and economical structure for center guide tread units including means for reinforcing the elongated tubular pivot members intermediate their ends, for mounting the center guide members on said tubular pivot member, for forming molded rubber track surfaces on the upper surface of the tread unit, and for securing metallic grousers to the under surface of the unit. Other objects of the invention will appear from time to time as the following description proceeds.

The invention may best be understood by reference to the accompanying drawings, in which:

Figure 1 is a top plan view of two connecting tread units constructed in accordance with my invention.

Figure 2 is a section taken on line 2—2 of Figure 1.

Figure 3 is a bottom view of one of the tread units, and showing another connected tread unit in dotted lines.

Figure 4 is an enlarged detail section on line 4—4 of Figure 1.

Figure 5 is a fragmentary detail perspective view of one end of a tread unit, with the pivot pins removed, and showing the molded rubber upper surface of said unit.

Figure 6 is a detail perspective view of the center guide member, removed from the tread unit.

Figure 7 is a fragmentary perspective view of one end of the tread unit, looking toward the under surface thereof, before the cleat member has been welded to the under side of the tubular pivot members, and the molded rubber bearing block has been applied to the upper surface of the unit.

Figure 8 is a detail perspective view of a grouser before welding to the pivot member.

Referring now to details of the invention illustrated in the drawings, a tread unit indicated generally at 10 consists of a pair of tubular steel pivot bearing sleeves 11, 11 extending transversely of the track proper, and rigidly connected at opposite ends by bars 12, 12. Each of said bars has eyes 13, 13 at opposite ends within which the ends of the pivot sleeves 11 are secured as by brazing or welding. The pivot sleeves 11, 11 and end bars 12, 12 thus form a rigid open rectangular link member, which is pivotally connected to similar adjacent units, such as unit 14, by pivot pins 16, 16 extending through rubber bushings 17, 17 in the pivot sleeves 11, and having relatively short C-shaped connectors 18, 18 suitably secured at opposite ends thereof, so that said connectors join adjacent tread units in short coupled relation, as shown in Figures 1 and 3. The rubber bushings 17, 17 between surrounding pivot pins 16, 16 in the pivot bearing sleeves 11, 11 afford sufficient turning movement between each pivot pin and tread unit, to provide the desired flexibility of the endless track. The pivot pins 16, resilient rubber bushings 17 and connectors 18, are all of well known construction, and form no part of the present invention, so need not be described in further detail.

The rectangular open frame formed by the tubular pivot bearing sleeves 11 and end bars 12 are similar in general structure to that heretofore employed in end-guided endless track treads of the kind disclosed in prior Patent No. 2,350,445, but in the present instance, the sleeves 11, 11 are considerably longer than usual, and have a centrally disposed guide member 20 mounted intermediate their ends. Accordingly, the subject of the present invention consists primarily in the novel arrangement whereby the center guide 20, upper molded rubber bearing blocks 21, 21, intermediate reinforcing webs 22, 22 and bottom grousers or cleats 35, 35 are mounted on the elongated frame to form a complete tread unit, as will now be described.

The center guide 20 consists of a metal block, preferably cast or forged in a single piece, with a central body portion having two spaced parallel bores 25, 25 of proper size to receive the two tubular sleeves 11, 11 in close fitting engagement therein. A guide member 26 projects upwardly from the body portion, the guide member shown herein being formed with an upright, transverse web 27 and forwardly and rearwardly extending flanges 28, 28 tapering slightly upwardly along opposite sides of the guide member, and also tapered upwardly at front and back thereof, to produce the desired running fit with suitable cooperating guide members on the drive sprockets and bogie wheels of the tank (not shown).

The guide block 20 has a substantially flat lower face 29, an integral ground-gripping grouser 30 formed transversely therealong, as herein shown, said grouser being offset toward one edge of said block, substantially in alignment with one of the bores 25 therein.

The guide block 20 is preferably secured in place on the tubular pivot sleeves 11 by brazing or welding, so as to provide said sleeves at the center of the tread.

The sleeves 11, 11 also have a reinforcing connection through the remainder of their length by metal webs 22, 22, disposed opposite sides of the center guide block 20, so as to fill the two otherwise open spaces in the rectangular frame between said guide block and the connecting links 12, 12 at opposite ends of the tread unit.

In the form shown herein, each of said webs 22 is formed of a metal plate having a substantially flat intermediate portion 31, and flanged opposite edges 32, 32 curved in cross section to fit against the opposed inner faces of the tubular sleeves 11, 11. The flat intermediate portion 31 may be arranged so as to be approximately in alignment between the axes of said sleeves as shown in Figure 4, and the flanges 32, 32 are rigidly secured to the sleeves 11, 11 as by brazing or welding. It will be observed that the webs 22, 22 form the bottoms of recesses at opposite sides of the center guide 20 within which the molded rubber bearing blocks 21, 21 are retained. Said bearing blocks project substantially above the side bars 12, and across the tops of the tubular pivot sleeves 11, and have a substantially flat upper surface 21a to provide resilient bearing engagement with the bogie wheels of the tank.

The bottom of the tread unit is provided with grousers or cleats 35, 35 at opposite sides of the center block 20. Said grousers are formed as by casting with parallel offset end portions 36, 37 connected by an intermediate diagonal section 38. The two end sections 36 and 37, are preferably preformed with longitudinal channels 36a and 37a, respectively arcuate in cross section so that each end section is adapted to fit against the lower surfaces of one of the tubular sleeves 11, while the diagonal section 38 spans the space between said sleeves, beneath the adjacent web 21, as shown in Figure 4.

The channelled portions 36a and 37a are rigidly connected to the sleeves 11, in the areas 36b and 37b indicated in dotted lines in Figure 7, as by welding.

In the form shown herein it will be observed that the grousers 35, 35 cooperate with the grouser 30 on the center guide 20 to form a substantially continuous ground gripping member as shown in Figure 3. It will be understood, however, that the design and arrangement of the grouser sections may be varied somewhat from that shown herein while utilizing the novel feature of providing part of the center grouser means integral with the center guide 20, and other grouser means mounted directly on the under surface of the tubular sleeves 11, 11, in the manner broadly disclosed herein.

The advantages of a tread unit constructed as above described will now be manifest. The resulting tread unit combines relative lightness with the required strength and resistance against the enormous stresses imposed thereon in use, especially against excessive bending of the tubular pivot sleeves 11, 11 so as to maintain the desired flexibility of tensional movement of the pivot pins in said sleeves. The relatively long pivot sleeves are directly reinforced intermediate their ends by the guide block 20 and the webs 22, 22 to resist the bowing action in opposite directions normally effective on the two sleeves of each tread unit when the track tread is under longitudinal pulling stresses. The center guide block 20 also carries part of the load on its grouser member 30, while the mounting of the other grouser members 35, directly on the pivot sleeves 11 affords an especially simple and strong yet light and economical structure for tread devices of this character.

Although I have shown and described certain embodiments of my invention, it will be understood that I do not wish to be limited to the exact construction shown and described, but that various changes and modifications may be made without departing from the spirit and scope of the invention as defined in the appended claims.

I claim:

1. In an endless track construction, a tread unit consisting of a pair of tubular pivot bearing sleeves having end members rigidly connecting them together, a metal guide block having parallel bores through which said bearing sleeves extend for connecting said bearing sleeves together intermediate their ends, said guide block including an upwardly projecting guide member, and said guide block also forming a part of the bottom load bearing surface of the tread unit.

2. In an endless track construction, a tread unit consisting of a pair of tubular pivot bearing sleeves having end members rigidly connecting them together, a metal guide block having parallel bores through which said bearing sleeves extend for connecting said bearing sleeves together intermediate their ends, said guide block including an upwardly projecting guide member, and said guide block also forming a part of the bottom load bearing surface of the tread unit, and grousers rigidly fixed to the under surface of said bearing sleeves at opposite sides of said guide block.

3. In an endless track construction, a tread unit consisting of a pair of tubular pivot bearing sleeves having end members rigidly connecting them together, a metal guide block connecting said bearing sleeves together intermediate their ends including an upwardly projecting guide member, said guide block also forming a part of the bottom load bearing surface of the tread including an integrally formed grouser, and other grouser means rigidly fixed to the under surface of said bearing sleeves at opposite sides of said guide block.

4. In an endless track construction, a tread unit consisting of a pair of tubular pivot bearing sleeves having end members rigidly connecting them together, a metal guide block connecting said bearing sleeves together intermediate their ends including an upwardly projecting guide member, said guide block also forming a part of the bottom load bearing surface of the tread unit including an integrally formed grouser, and other grousers rigidly fixed to the under surface of said bearing sleeves at opposite sides of said guide block, said grousers meeting at adjacent ends to form a substantially continuous ground gripping member.

5. In an endless track construction, a tread unit consisting of a pair of tubular pivot bearing sleeves having end members rigidly connecting them together, a metal guide block having parallel bores through which said bearing sleeves extend for connecting said bearing sleeves together intermediate their ends, said guide block including an upwardly projecting guide member, and horizontally disposed metal webs having flanged edges fixed to said sleeves at opposite sides of said guide block to resist bending of said sleeves, and resilient bearing blocks covering the upper surface of said sleeves and seated on said webs.

6. In an endless track construction, a tread unit consisting of a pair of tubular pivot bearing sleeves having end members rigidly connecting them together, a metal guide block having parallel bores through which said bearing sleeves extend for connecting said bearing sleeves together intermediate their ends, said guide block including an upwardly projecting guide member, and said guide block also forming a part of the bottom load bearing surface of the tread unit, and grousers rigidly fixed to the under surface of said bearing sleeves at opposite sides of said guide block.

7. In an endless track construction, a tread unit consisting of a pair of tubular pivot bearing sleeves having end members rigidly connecting them together, a metal guide block having parallel bores through which said bearing sleeves extend for connecting said bearing sleeves together intermediate their ends, said guide block including an upwardly projecting guide member, and said guide block also forming a part of the bottom load bearing surface of the tread including an integrally formed grouser, and other grouser means rigidly fixed to the under surface of said bearing sleeves at opposite sides of said guide block.

GUSTAV M. WALLER.

REFERENCES CITED

The following references are of record in the file of this patent:

UNITED STATES PATENTS

| Number | Name | Date |
|---|---|---|
| 2,043,235 | Colby | June 9, 1936 |
| 2,234,927 | Kubaugh | Mar. 11, 1941 |
| 2,350,445 | Burgess | June 6, 1944 |
| 2,389,156 | Knox | Nov. 20, 1945 |